United States Patent
Duchesne et al.

(10) Patent No.: US 10,922,253 B1
(45) Date of Patent: Feb. 16, 2021

(54) IMPLEMENTING INTERRUPT REMAPPING VIA INPUT/OUTPUT MEMORY MANAGEMENT UNIT FAULTS

(71) Applicant: VMware, Inc., Palo Alto, CA (US)

(72) Inventors: Regis Duchesne, Monts-de-Corsier (CH); Alexander Fainkichen, Cambridge, MA (US); Cyprien Laplace, Boston, MA (US); Ye Li, Newton Highlands, MA (US); Andrei Warkentin, North Andover, MA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/660,337

(22) Filed: Oct. 22, 2019

(51) Int. Cl.
*G06F 13/24* (2006.01)
*G06F 13/16* (2006.01)
*G06F 13/10* (2006.01)

(52) U.S. Cl.
CPC ............ *G06F 13/24* (2013.01); *G06F 13/102* (2013.01); *G06F 13/1668* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,489,789 B2 * | 7/2013 | Serebrin | ............. | G06F 9/45558 710/267 |
| 2006/0294277 A1 * | 12/2006 | Tetrick | .................... | G06F 13/24 710/269 |
| 2008/0114916 A1 * | 5/2008 | Hummel | .................. | G06F 13/24 710/266 |
| 2010/0191889 A1 * | 7/2010 | Serebrin | ............... | G06F 9/4812 710/269 |
| 2011/0197003 A1 * | 8/2011 | Serebrin | ................. | G06F 13/24 710/267 |
| 2013/0145055 A1 * | 6/2013 | Kegel | ................. | G06F 12/0223 710/26 |
| 2014/0359187 A1 * | 12/2014 | Murata | ................... | G06F 13/24 710/267 |
| 2015/0127871 A1 * | 5/2015 | Desai | ...................... | G06F 13/28 710/308 |
| 2016/0055108 A1 * | 2/2016 | Williamson | .............. | G06F 9/50 710/261 |

* cited by examiner

*Primary Examiner* — Raymond N Phan
(74) *Attorney, Agent, or Firm* — Thomas Horstemeyer, LLP

(57) ABSTRACT

Disclosed are various embodiments for software-based interrupt remapping. A memory address for a respective interrupt request of the peripheral device is allocated. The peripheral device is then configured to write to the memory address to raise an interrupt with the processor. Later, it can be determined that the peripheral device has attempted to write to the memory address. In response, an interrupt can be raised for the respective interrupt request with the processor of the computing device on behalf of the peripheral device.

20 Claims, 5 Drawing Sheets

IMPLEMENTING INTERRUPT REMAPPING VIA INPUT/OUTPUT MEMORY MANAGEMENT UNIT FAULTS

BACKGROUND

Peripheral devices in a computing device often issue interrupts to notify the processor of the computing device of the occurrence of an event that requires action. For devices that have direct memory access (DMA) capabilities, interrupts are often raised by writing to a specific, preconfigured memory address. In the virtualization context, however, such devices may not normally be available to a virtual machine (VM) executing on a host machine because the guest VM would not know the host-physical memory addresses used for interrupt handling.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for providing interrupt remapping in software. Because interrupts are remapped in software, direct access to peripheral devices can be safely provided to virtual machine guests hosted on a host machine that lacks hardware based virtualization of the input/output memory management unit (IOMMU). For example, x86-based host devices that fail to implement either the AMD-Vi or INTEL VT-d instructions can still provide guests with direct access to peripheral devices installed on the host machine safely. Similarly, ARM-based host devices that fail to implement a system memory management unit (SMMU) can still provide guests with direct access to peripheral devices installed on the host machines safely.

Interrupts are a mechanism used by hardware devices to notify a computing system of the occurrence of an event that requires handling. For example, input devices (e.g., mice and keyboards) could raise interrupts to notify a computing system of the occurrence of a mouse-click or keyboard press. As another example, network interface cards (NICs) can raise interrupts to notify the system that a packet or series of packets has been received.

Moreover, interrupts can be raised in various ways. For example, some devices may have a dedicated interrupt request (IRQ) circuit that can be used to signal to a chipset that an interrupt is being raised. As another example, peripheral devices that have direct memory access (DMA) to the memory address space of the computing device can use DMA writes to predefined memory addresses to signal an interrupt. This could be performed, for example, using message signaled interrupts (MSI).

Figure 1:
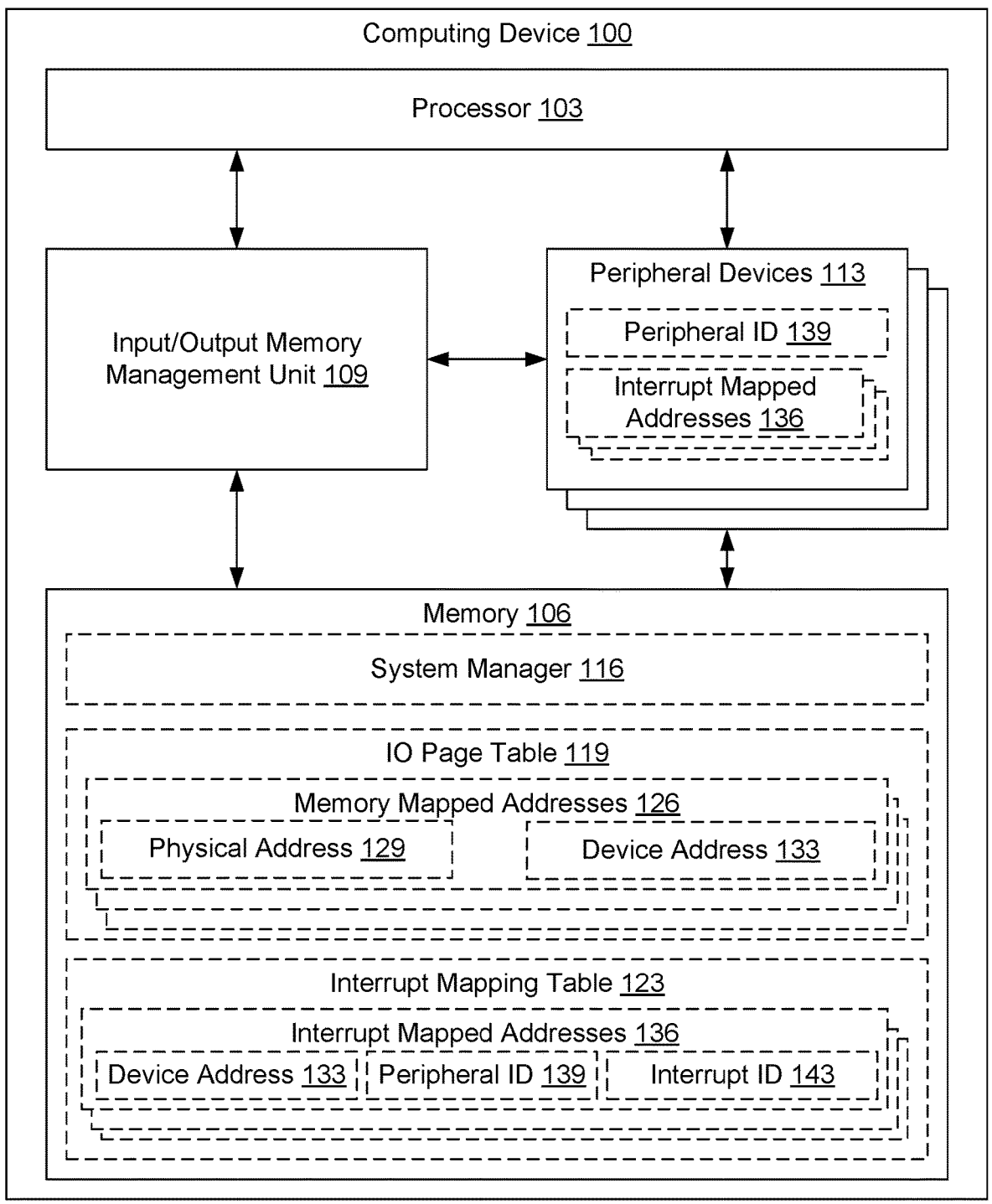
FIG. 1 is a schematic block diagram of computing device according to various embodiments of the present disclosure.

FIG. 1 depicts a schematic block diagram of an example of a computing device 100. The computing device 100 can include at least one central processor unit (CPU) 103, memory 106, an input/output memory management unit (IOMMU) 109, and one or more peripheral devices 113. The processor 103, memory 106, IOMMU 109, and peripheral devices 113 can be connected with various system buses, which provide for data connection between the CPU 103, memory 106, IOMMU 109, and peripheral devices 113. Examples of these system buses include the front side bus, point-to-point processor interconnects, the peripheral component interconnect (PCI) bus, the peripheral component interconnect express (PCI-E) bus, the universal serial bus (USB), etc.

The CPU 103 is representative of electronic circuitry that carries out machine-readable instructions and causes the computing device 100 to perform actions or computations identified by the machine-readable instructions. A computing device 100 can include multiple CPUs 103. Moreover, a CPU 103 can include multiple cores, each of which can independently carry out machine-readable instructions.

The memory 106 is representative of electrical circuits or magnetic apparatuses that can store data or machine-readable instructions. Although a single memory 106 is depicted, the memory can include multiple components which can be arranged in multiple ways. For example, the memory 106 can include low latency, high-bandwidth random-access memory (RAM) that stores data or machine-readable instructions that are frequently or currently accessed and is backed by high-capacity, higher latency, and lower bandwidth disk drives. Accordingly, the memory 106 can be representative of both volatile and nonvolatile memory or data storage components. Volatile components are those that do not retain data values upon loss of power. Nonvolatile components are those that retain data upon a loss of power. Examples of memory 106 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The IOMMU 109 is a memory management unit that connects direct-memory-access (DMA) capable peripheral devices 113 to the memory 106. The IOMMU 109 can be used to implement virtual memory functionality for peripheral devices 113 that are DMA capable. For example, the IOMMU 109 can map or translate device-visible virtual memory addresses into physical memory 106 addresses.

The peripheral devices 113 represent hardware devices connected to various device buses to provide additional functionality to the computing device 100. Examples of peripheral devices 113 include network interface cards (NICs) to provide networking capability to the computing device 100, input devices (e.g., keyboards, mice, joysticks, touchscreens, etc.) top allow a user to input data or commands, graphics processing units (GPUs), cryptographic accelerators, printers, scanners, cameras, microphones, speakers, etc.

Stored in the memory 106 are both data and applications that are executable by the processor 103. This can include the system manager 116, an Input/Output (TO) Page Table 119, and an Interrupt Mapping Table 123.

The system manager 116 is representative of system software that manages computer hardware, software resources, and provides common services for other programs (e.g., memory allocation or management, task scheduling, resource management, etc.). Accordingly, the system manager 116 may have direct or low-level access to various hardware resources of the computing device 100, including the processor 103, the memory 106, the IOMMU 106, and/or one or more peripheral devices 113. Examples of system managers 116 can include operating systems (e.g., MICROSOFT WINDOWS®, LINUX®, etc.) or hypervisors (e.g., VMWARE® or XEN®).

The IO page table 119 is mapping of virtual memory addresses to physical memory addresses that is used by the IOMMU 109 to provide virtual memory functionality to peripheral devices 113. Accordingly, the IO pages table 119 can contain an entry of memory mapped addresses 126. Each memory mapped address 126 can include a physical address 129 and a device address 133. The physical address 129 represents a physical location in the memory 106 where data or program instructions are stored. The device address 133 represents a logical or virtual memory address that is visible to the peripheral device 133 and that can be utilized by a peripheral device 113 for reading data from or writing data to the memory 106.

Often, a separate IO page table 119 may be associated with each peripheral device 113. In these implementations, the IO page table 119 can include a peripheral identifier 139 to allow the system manager 116 to determine which IO page table 119 is used for a particular peripheral device 113.

The interrupt mapping table 123 is a mapping of virtual memory addresses to peripheral device 113 specific interrupt requests. Accordingly, the interrupt mapping table 123 can include a list of interrupt mapped addresses 136, which are device addresses 133 assigned to a peripheral device. Accordingly, each interrupt mapped address 136 can include a device address 133 for a peripheral device 113, and also include or be associated with a peripheral identifier 139, and an interrupt identifier 143. The peripheral identifier 139 is an identifier that uniquely identifies a peripheral device 113 connected to the computing device 100 with respect to other peripheral devices 113 connected to the computing device 100. Examples of peripheral identifiers 139 include logical unit numbers (LUNs), device enumerations, etc.

The interrupt identifier 143 is a representation of the type of interrupt being raised by the respective peripheral device 113. As each peripheral device 113 may be capable of raising multiple types of interrupts, an interrupt identifier 143 may be stored in association with the device address 133 to allow the system manager 116 to determine the type of interrupt being raised based at least in part on the device address 133 that the peripheral device 113 is attempting to write to. For example, a network interface card (NIC) may raise one interrupt when a packet is received and a second interrupt when a packet is sent. Accordingly, two interrupt mapped addresses 136 can be stored in the interrupt mapping table 123. The first interrupt mapped address 136 can include a first device address 133 and a first interrupt identifier 143 indicating that a packet has been received and the second interrupt mapped address 136 can include a second device address 133 and a second interrupt identifier 143 indicating that a packet has been sent.

Each peripheral device 113 may also have a copy of the peripheral identifier 139 assigned to it and one or more interrupt mapped addresses 136 assigned to it. For example, the peripheral device 113 can be provided with copies of the interrupt mapped addresses 136 in order to allow the peripheral device 113 to indicate that an interrupt has been received by writing to the respective device address 133 associated with a particular interrupt identifier 143.

Next, a general description of the operation of the various components of the computing device 100 is provided. While the following description is an example of one approach in which the computing device 100 may be operated, other approaches can be used according to various embodiments of the present disclosure. A more detailed description of the operation of individual components is provided in the following discussions of FIGS. 2-5.

To begin, the system manager 116 assigns a device address 133 to an interrupt identifier 143 for a particular peripheral device 113. For example, the system manager 116 could identify a peripheral device 113 connected to a PCI-E bus and assign a device address 133 for a particular interrupt represented by the respective interrupt identifier 143. As part of the assignment address, the system manager 116 can check the interrupt mapping table 123 to determine whether the device address 133 has already been mapped (e.g., for use as an interrupt mapped address 136 for another peripheral device 113, for use by a peripheral device 113 for a direct memory access (DMA) data transfer or operation, etc.). If the device address 133 has already been mapped, then another device address 133 may be selected for use as an interrupt mapped address 136. Furthermore, any device address 133 that was previously assigned to a peripheral device 113 for use as an interrupt mapped address 136 may also be removed from the interrupt mapping table 123. The system manager 116 can then store the assignment as an interrupt mapped address 136 in the interrupt mapping table 123. Subsequently, the peripheral device 113 can raise an interrupt. For example, a mouse may wish to indicate that button was clicked or a scroll wheel was moved. As another example, a NIC may wish to indicate that a packet has been received. Accordingly, the peripheral device 113 can search the interrupt mapped addresses 136 assigned to it to see which device address 133 is mapped to the appropriate interrupt identifier 143 for the interrupt to be raised. The peripheral device 113 can then write arbitrary data to the device address 133 to indicate that an interrupt has been raised.

The IOMMU 109 will receive the write request from the peripheral device 113 and search the IO page table 119 for a memory mapped address 126 containing the physical address 129 mapped to the device address 133 written to by the peripheral device 113. Because the system manager 116 has removed any memory mapped addresses 126 containing a mapping of the device address 133 used as an interrupt mapped address 136, the IOMMU 109 will not find any respective memory mapped addresses 126. In response, the IOMMU 109 will generate a page fault that lists the device address 133 used as the interrupt mapped address 136 that the peripheral device 113 had been attempting to write too.

The system manager 116 can then capture the page fault and analyze the page fault to determine which peripheral device 113 was attempting to raise the interrupt and the type of interrupt being raised. For example, the system manager 116 search for an interrupt mapped address 136 in the interrupt mapping table 123 that includes or corresponds to the device address 133. The system manager 116 can then determine which peripheral device 113 raised the interrupt and the type of interrupt being raised based at least in part on the peripheral identifier 139 and the interrupt identifier 143 stored in association with the device address 133. The system manager 116 can then raise the interrupt for handling or further processing.

Figure 2:
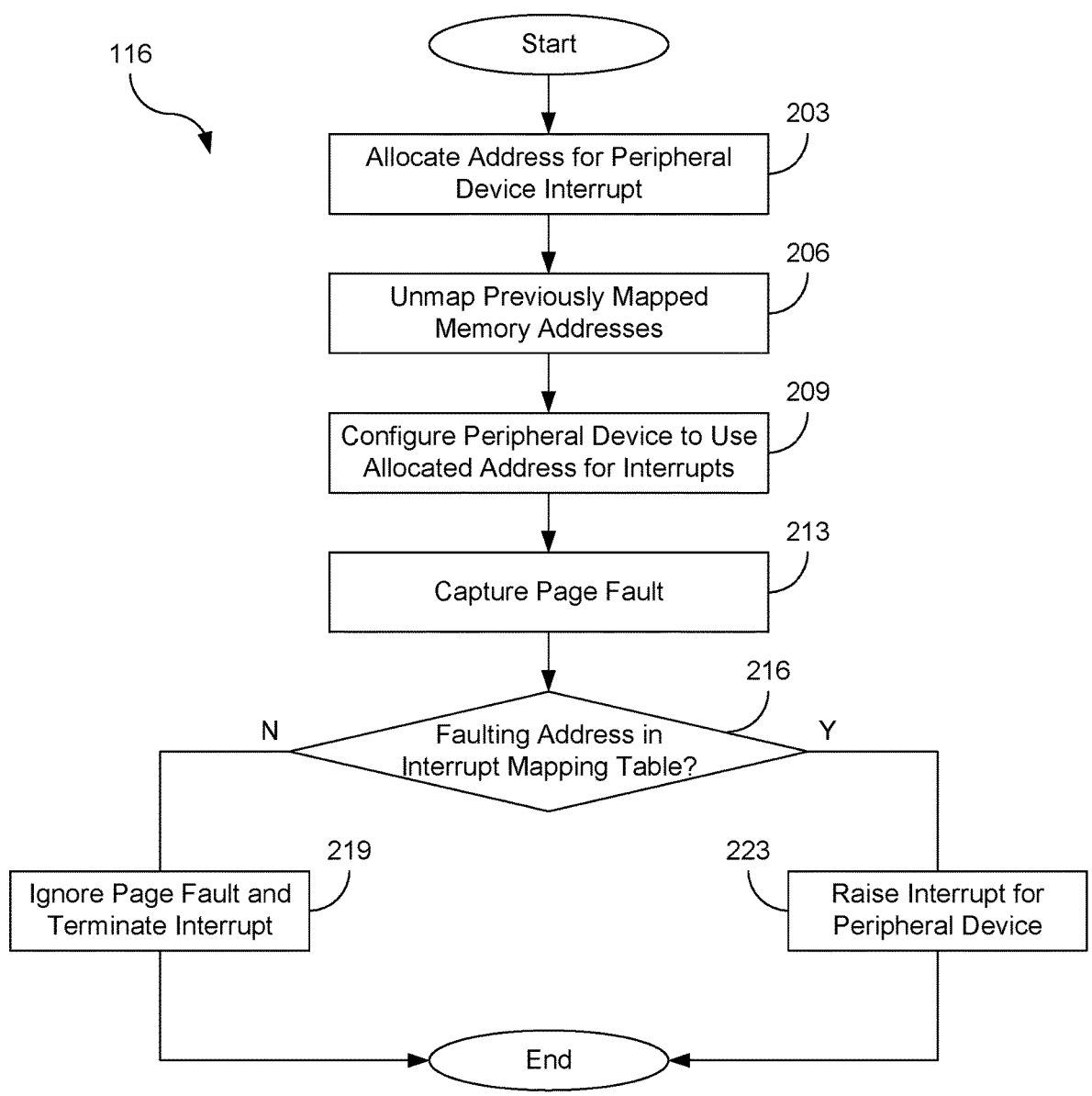
FIG. 2 is a flowchart illustrating one example of functionality implemented as portions of an application executed in the computing device of FIG. 1 according to various embodiments of the present disclosure.

Referring next to FIG. 2, shown is a flowchart that provides one example of the operation of a portion of the system manager 116. It is understood that the flowchart of FIG. 2 provides merely an example of the many different types of functional arrangements that can be employed to implement the operation of the depicted portion of the system manager 116. As an alternative, the flowchart of FIG. 2 can be viewed as depicting an example of elements of a method implemented within the computing device 100.

Beginning with step 203, the system manager 116 can allocate a device address 133 for use by a peripheral device 113 for raising an interrupt. For example, the system manager 116 may identify a device address 133 that has not been used for interrupt remapping and allocate the device address 133 for this purpose. This can be accomplished, for instance, by searching the interrupt mapping table 123 to determine which device addresses 133 have already been allocated, and then selecting an unallocated device address 133 for interrupt remapping.

Then at step 206, the system manager 116 can, in some implementations, unmap any interrupt mapped addresses 136 previously assigned to the peripheral device 113. For example, during the initial boot process, an interrupt mapped address 136 may have been initially assigned or allocated on behalf of the peripheral device 113 (e.g., a real MSI address). Such previously mapped interrupt mapped addresses 136 can be unmapped in order to cause interrupts raised by a malicious or defective peripheral device 113 to be ignored.

Subsequently, at step 209, the system manager 116 can then configure the peripheral device 113 to use the allocated device address 133 for raising the respective interrupt. For example, the system manager 116 could send the device address 133 to the peripheral device 113 the respective interrupt identifier 143 to indicate to the peripheral device 113 which device address 133 to write to in order to raise a particular interrupt with the system manager 116.

The system manager 116 can then wait until a page fault is raised by the IOMMU 109. Once the page fault is raised, the system manager 116 can capture, trap, or otherwise process the page fault at step 213, to determine the device address 133 that causes the page fault.

After determining the device address 133 associated with the page fault, the system manager 116 can determine whether the device address 133 is associated with an interrupt mapped address 136 included in the interrupt mapping table 123. If the device address 133 is not present, then the system manager 116 can proceed to step 219. Otherwise, if the device address 133 is present, then the system manager 116 can proceed to step 223.

If the process proceeds to step 219, then the system manager 116 can ignore the page fault and terminate the interrupt. The implication is that the peripheral device 113 wrote to an unmapped memory address. This could be the result of a bug in the peripheral device 113 or an attempt by the peripheral device to write to a portion of memory 106 that has not yet been allocated or mapped by the IOMMU 109. The process subsequently ends.

However, if the process proceeds to step 223, then the system manager 116 can raise the interrupt. For example, the system manager 116 might implement an interrupt handler or similar routine for the peripheral device 113 interrupt corresponding to the interrupt identifier 143 linked to the device address 133. As another example, the system manager 116 might pass or forward the interrupt (e.g., the peripheral identifier 139 and interrupt identifier 143) onto the processor 103 for further processing. The process then subsequently ends.

Figure 3:
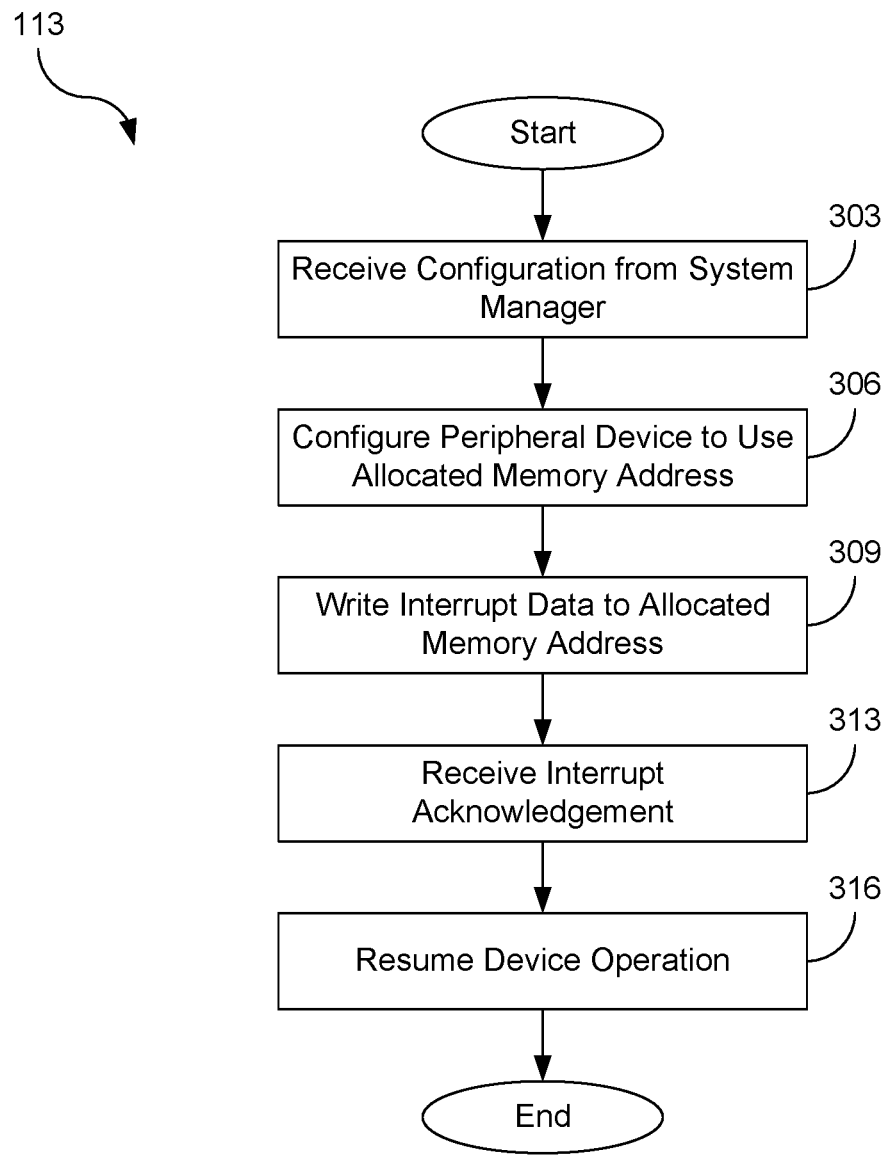
FIG. 3 is a flowchart illustrating one example of functionality implemented as portions of an application executed in the computing device of FIG. 1 according to various embodiments of the present disclosure.

Referring next to FIG. 3, shown is a flowchart that provides one example of the operation of a portion of the peripheral device 113. It is understood that the flowchart of FIG. 3 provides merely an example of the many different types of functional arrangements that can be employed to implement the operation of the depicted portion of the peripheral device 113. As an alternative, the flowchart of FIG. 3 can be viewed as depicting an example of elements of a method implemented within the computing device 100.

Beginning with step 303, the peripheral device 113 can receive a configuration from the system manager 116. The configuration can include a device address 133 and an interrupt identifier 143 mapped to the device address 133. As a result, the peripheral device 113 is able to determine the memory address that it should write a message to when it attempts to raise an interrupt identified by the respective interrupt identifier 143.

Then at step 306, the peripheral device 113 can configure itself to use the allocated device address 133 to raise interrupts identified by the respective interrupt identifier 143. For example, the peripheral device 113 could store the device address 133 and the interrupt identifier 143 in a local cache to allow the peripheral device 113 to identify the device address 133 when it needs to raise an interrupt.

Next at step 309, the peripheral device 113 can write interrupt data to the allocated device address 133 to raise an interrupt associated with the interrupt identifier 143. The interrupt can be any arbitrary data that will fit within the device address 133 because it is the act of writing to the device address itself that raises the interrupt, rather than the data that is written. The process of writing to the device address 133 may be the same as or similar to how a peripheral device 133 would use message signaled interrupts (MSI) to raise an interrupt. In some implementations, the peripheral device 113 may pause while it waits for the interrupt to be acknowledged and processed.

Moving on to step 313, the peripheral device 113 can receive an interrupt acknowledgement from the system manager 116. For example, the system manager 116 could write an acknowledgement message to predefined memory address that is polled by the peripheral device 113. Once the acknowledgement message is identified, the peripheral device 113 could resume operation at step 316 and clear the memory address for use in acknowledging future interrupts. However, if no acknowledgement message is received, the peripheral device 113 could instead resume operation at step 316 after a predefined period of time has passed.

Finally, at step 316, the peripheral device 113 can resume operation in response to acknowledgement of the interrupt. If an acknowledgement was not received at step 313, the peripheral device 113 can instead resume operation after a timeout period has passed in some embodiments.

Figure 4:
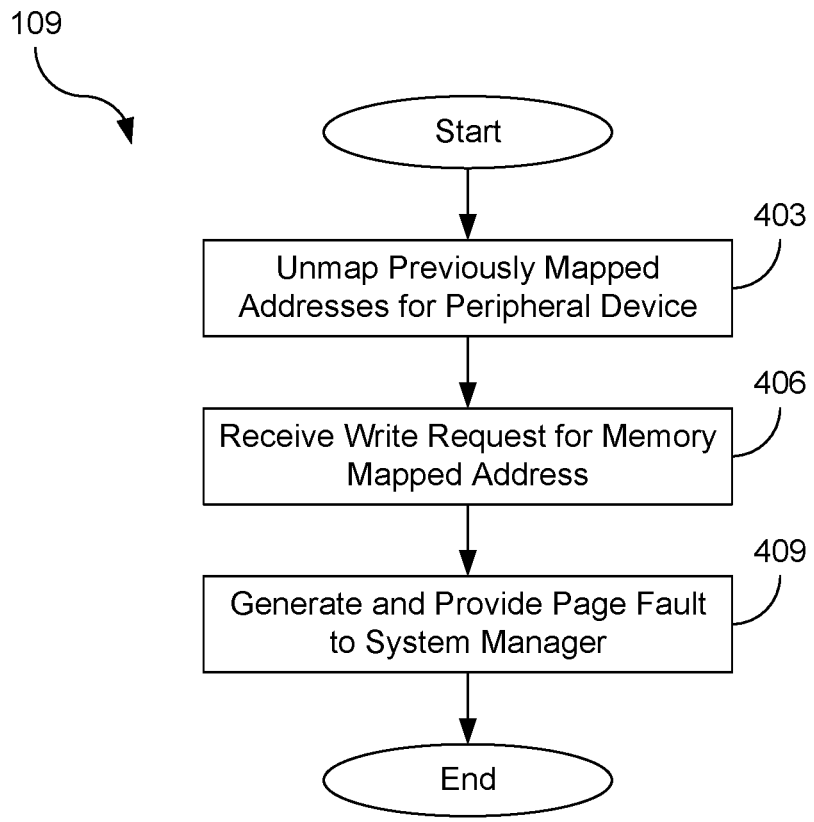
FIG. 4 is a flowchart illustrating one example of functionality implemented as portions of an application executed in the computing device of FIG. 1 according to various embodiments of the present disclosure.

Referring next to FIG. 4, shown is a flowchart that provides one example of the operation of a portion of the IOMMU 109. It is understood that the flowchart of FIG. 4 provides merely an example of the many different types of functional arrangements that can be employed to implement the operation of the depicted portion of the IOMMU 109. As an alternative, the flowchart of FIG. 4 can be viewed as depicting an example of elements of a method implemented within the computing device 100.

Beginning with step 403, the IOMMU 109 can unmap a previously allocated memory mapped address 126. For example, the IOMMU 109 may receive an instruction from the system manager 116 to remove from the IO page table 119 a memory mapped address 126 that includes a device address 133 identified by the system manager 116.

Then at step 406, the IOMMU 109 can receive a write request from a peripheral device 113 to the device address 133 that was previously unmapped at step 403. For example, the peripheral device 113 could be attempting to write to the device address 133, thereby causing the processor 103 to request that the IOMMU 109 provide the physical address 129 mapped to the device address 133.

Next at step 409, the IOMMU 109 can generate a page fault indicating that no memory mapped address 126 exists that maps the physical address 129 to the device address 133. The page fault can include the device address 133 that the peripheral device 113 was attempting to access. The IOMMU 109 can then provide the page fault to the system manager 116 for further action.

Figure 5:
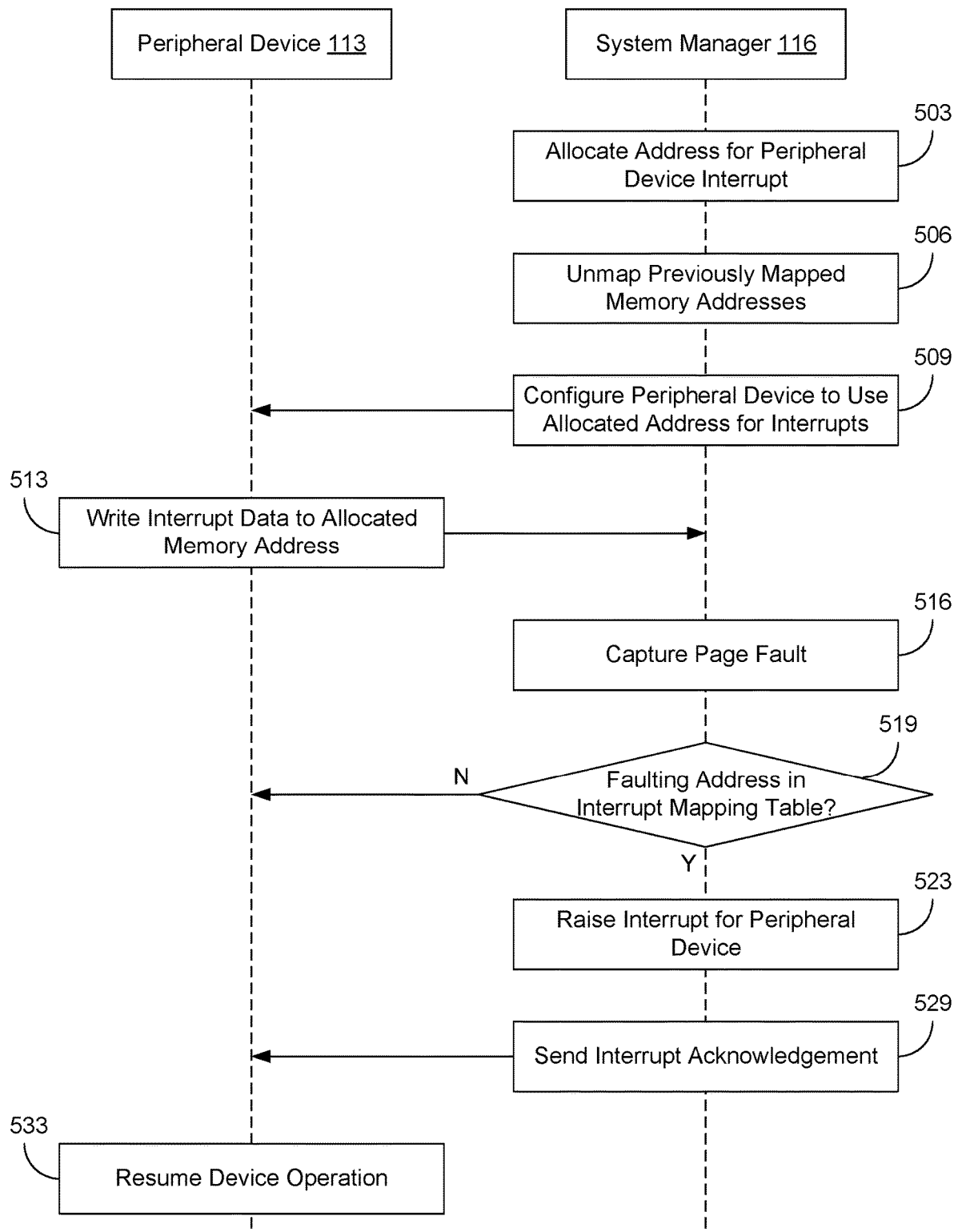
FIG. 5 is a sequence diagram illustrating one example of functionality implemented as portions of an application executed in the computing device of FIG. 1 according to various embodiments of the present disclosure.

Referring next to FIG. 5, shown is a flowchart that provides one example of the interaction between the system manager 116 and the peripheral device 113. It is understood that the sequence diagram of FIG. 5 provides merely an example of the many different types of functional arrangements that can be employed by the peripheral device 113 and the system manager 116. As an alternative, the flowchart of FIG. 5 can be viewed as depicting an example of elements of a method implemented within the computing device 100.

Beginning with step 503, the system manager 116 can allocation a device address 133 for the peripheral device 113 to use for raising interrupts. This can be performed as previously described at step 203.

Then at step 506, the system manager 116 can cause the device address 133 to be unmapped from the 10 page table 119. This can be performed in the manner previously discussed at step 206.

Next at step 509, the system manager 116 can configure the peripheral device 113 to use the allocated device address 133 when raising interrupts. This can be performed in the manner previously discussed at step 209.

At step 513, the peripheral device 113 can raise an interrupt by attempting to write data to the device address 133 that it was configured to use by the system manager 116 at step 509. For example, if a mouse wished to indicate that its left button had been clicked, it might raise a first interrupt by writing to a first device address 133. To indicate that its right button had been clicked, it might raise a second interrupt by writing to a second device address 133. This can be performed in the manner previously described at step 309.

Because the device address 133 is not mapped to a physical address 129 in the IO page table 119, the attempt by the peripheral device 113 to write data to the device address 133 will cause the IOMMU 109 to generate a page fault. Accordingly, the system manager 116 can, at step 516, capture the page fault and determine which device address 133 was the source of the page fault, as previously described in step 213.

At step 519, the system manager 116 can evaluate whether the device address 133 that originated the page fault is present in the interrupt mapping table 123, as previously described at step 216. If the device address 133 is not present in the interrupt mapping table 123, the write attempt is ignored. Eventually, the peripheral device 113 will resume operation at step 533.

However, if the device address 133 is present in the interrupt mapping table 123, then the system manager can raise or otherwise handle the interrupt step 523. For example, the system manager 116 might implement an interrupt handler or similar routine for the peripheral device 113 interrupt corresponding to the interrupt identifier 143 linked to the device address 133. As another example, the system manager 116 might pass or forward the interrupt (e.g., the peripheral identifier 139 and interrupt identifier 143) onto the processor 103 for further processing.

At step 529, the system manager 116 could then send an acknowledgement to the peripheral device 113 to indicate that the interrupt had been successfully raised. For example, the system manager 116 could write an acknowledgement to a predefined or specified memory address that is polled by the peripheral device 113.

At step 533, the peripheral device 113 can resume operation, assuming that it had paused pending the handling of the interrupt. For example, the peripheral device 113 could regularly poll a predefined memory address for an acknowledgement message. Once the acknowledgement message is identified, the peripheral device 113 could resume operation and clear the memory address for use in acknowledging future interrupts. However, if no acknowledgement message is received, the peripheral device 113 could instead resume operation after a predefined period of time has passed.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing device 100.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor, a memory, an input/output memory management unit (IOMMU), and a peripheral device;
machine-readable instructions stored in the memory that, when executed by the processor, cause the processor to at least:
allocate a memory address for a respective interrupt request of the peripheral device;
configure the peripheral device to write to the memory address to raise an interrupt with the processor;
remove the memory address from a page table assigned to the IOMMU;
determine that the peripheral device has attempted to write to the memory address based at least in part on detection of a page table fault raised by the IOMMU in response to an attempt to write to the memory address by the peripheral device; and
raise an interrupt for the respective interrupt request with the processor of the computing device on behalf of the peripheral device.

2. The system of claim 1, wherein the machine-readable instructions further cause the processor to at least:
store a mapping of the address to the respective interrupt request in a mapping table; and
search for the respective interrupt request in the mapping table in response to a determination that the peripheral device has attempted to write to the memory address.

3. The system of claim 1, wherein the machine-readable instructions further cause the processor to at least:
ignore the write of the peripheral device to the memory address; and
return a response to the peripheral device that the interrupt was raised with the processor.

4. The system of claim 1, wherein the memory address is one of a plurality of memory addresses allocated to the peripheral device for respective ones of a plurality of interrupt requests associated with the peripheral device.

5. The system of claim 1, wherein the machine-readable instructions further cause the processor to at least provide an acknowledgement to the peripheral device that the interrupt has been handled.

6. The system of claim 1, wherein the machine-readable instructions further cause the processor to at least unmap a previously assigned memory address associated with the peripheral device.

7. A method, comprising:
allocating a memory address for a respective interrupt request of a peripheral device;
configuring the peripheral device to write to the memory address to raise an interrupt with a processor;
determining that the peripheral device has attempted to write to the memory address;
ignoring the write of the peripheral device to the memory address;
returning a response to the peripheral device that the interrupt was raised with the processor; and
raising an interrupt for the respective interrupt request with a processor of a computing device on behalf of the peripheral device.

8. The method of claim 7, removing the memory address from a page table assigned to an input/output memory management unit (IOMMU).

9. The method of claim 7, further comprising:
storing a mapping of the address to the respective interrupt request in a mapping table; and
searching for the respective interrupt request in the mapping table in response to a determination that the peripheral device has attempted to write to the memory address.

10. The method of claim 7, wherein the memory address is one of a plurality of memory addresses allocated to the peripheral device for respective ones of a plurality of interrupt requests associated with the peripheral device.

11. The method of claim 7, further comprising providing an acknowledgement to the peripheral device that the interrupt has been handled.

12. The method of claim 7, further comprising unmapping a previously assigned memory address associated with the peripheral device.

13. The method of claim 8, wherein determining that the peripheral device has attempted to write to the memory address further comprises detecting a page table fault raised by the IOMMU in response to an attempt to write to the memory address by the peripheral device.

14. A system, comprising:
a computing device comprising a processor, a memory, an input/output memory management unit (IOMMU), and a peripheral device;
machine-readable instructions stored in the memory that, when executed by the processor, cause the processor to at least:
allocate a memory address for a respective interrupt request of the peripheral device;
store a mapping of the address to the respective interrupt request in a mapping table:
configure the peripheral device to write to the memory address to raise an interrupt with the processor;
determine that the peripheral device has attempted to write to the memory address;
search for the respective interrupt request in the mapping table in response to a determination that the peripheral device has attempted to write to the memory address; and
raise an interrupt for the respective interrupt request with the processor of the computing device on behalf of the peripheral device.

15. The system of claim 14, wherein the machine-readable instructions further cause the processor to at least remove the memory address from a page table assigned to the IOMMU.

16. The system of claim 14, wherein the machine-readable instructions further cause the processor to at least:
ignore the write of the peripheral device to the memory address; and
return a response to the peripheral device that the interrupt was raised with the processor.

17. The system of claim 14, wherein the memory address is one of a plurality of memory addresses allocated to the peripheral device for respective ones of a plurality of interrupt requests associated with the peripheral device.

18. The system of claim 14, wherein the machine-readable instructions further cause the processor to at least unmap a previously assigned memory address associated with the peripheral device.

19. The system of claim 14, wherein the machine-readable instructions that cause the processor to configure the peripheral device to write to the memory address to raise the interrupt with the processor further cause the processor to send the allocated memory address and an interrupt identifier to the peripheral device.

20. The system of claim 15, wherein the machine-readable instructions that cause the processor to determine that the peripheral device has attempted to write to the memory address further cause the processor to at least detect a page table fault raised by the IOMMU in response to an attempt to write to the memory address by the peripheral device.

* * * * *